United States Patent
Mu et al.

(10) Patent No.: US 10,771,197 B2
(45) Date of Patent: Sep. 8, 2020

(54) METHOD FOR TRANSMITTING HYBRID AUTOMATIC REPEAT REQUEST FEEDBACK INFORMATION, AND USER EQUIPMENT

(71) Applicant: NTT DOCOMO INC., Tokyo (JP)

(72) Inventors: Qin Mu, Beijing (CN); Liu Liu, Beijing (CN); Huiling Jiang, Beijing (CN); Naoto Okubo, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,735

(22) PCT Filed: Aug. 10, 2017

(86) PCT No.: PCT/CN2017/096717
§ 371 (c)(1),
(2) Date: Feb. 11, 2019

(87) PCT Pub. No.: WO2018/028616
PCT Pub. Date: Feb. 15, 2018

(65) Prior Publication Data
US 2019/0222363 A1    Jul. 18, 2019

(30) Foreign Application Priority Data

Aug. 11, 2016   (CN) .......................... 2016 1 0659378

(51) Int. Cl.
*H04L 1/18*    (2006.01)
*H04L 1/16*    (2006.01)
(Continued)

(52) U.S. Cl.
CPC .............. *H04L 1/1819* (2013.01); *H04L 1/16* (2013.01); *H04L 1/18* (2013.01); *H04W 72/042* (2013.01);
(Continued)

(58) Field of Classification Search
CPC ....... H04L 1/1819; H04L 1/1812; H04L 1/08; H04L 1/1607; H04L 1/1829;
(Continued)

(56) References Cited

U.S. PATENT DOCUMENTS

2011/0044278 A1*  2/2011  Astely ................... H04L 1/1621
                                                              370/329
2013/0223318 A1    8/2013  Liu et al.
(Continued)

FOREIGN PATENT DOCUMENTS

CN    101567775 A    10/2009
CN    102017504 A    4/2011
(Continued)

OTHER PUBLICATIONS

International Search Report for PCT/CN2017/096717, ISA/CN, Haidian District, Beijing, dated Oct. 27, 2017, with English translation attached.
(Continued)

*Primary Examiner* — Wutchung Chu
(74) *Attorney, Agent, or Firm* — Osha Liang LLP

(57) ABSTRACT

Disclosed are a method for transmitting Hybrid Automatic Repeat Request (HARQ) feedback information, a user equipment, and a base station. The method includes: determining a reception window of data on which HARQ binding is to be performed; detecting data in the reception window; and bundling and transmitting HARQ feedback information for the data detected in the reception window. By means of the method, the user equipment and the base station, HARD bundling can be very conveniently implemented in a Half-Duplex (HD) frequency division multiplexing system.

11 Claims, 4 Drawing Sheets

(51) Int. Cl.
*H04W 72/04* (2009.01)
*H04W 80/08* (2009.01)
*H04W 88/02* (2009.01)

(52) U.S. Cl.
CPC ....... *H04W 72/0446* (2013.01); *H04W 80/08* (2013.01); *H04W 88/02* (2013.01)

(58) Field of Classification Search
CPC ... H04L 1/1854; H04L 1/1896; H04L 1/1664; H04W 72/042; H04W 72/0446; H04W 80/08; H04W 88/02
See application file for complete search history.

(56) References Cited

U.S. PATENT DOCUMENTS

| | | | | |
|---|---|---|---|---|
| 2014/0233541 A1* | 8/2014 | Kim | ...................... | H04L 5/0037 370/336 |
| 2014/0362816 A1 | 12/2014 | Liu et al. | | |
| 2015/0245323 A1* | 8/2015 | You | ..................... | H04W 72/042 370/329 |
| 2016/0143017 A1* | 5/2016 | Yang | ................. | H04W 72/0406 370/329 |
| 2016/0165640 A1* | 6/2016 | Yang | ................. | H04W 72/0413 370/336 |
| 2016/0242203 A1* | 8/2016 | You | ..................... | H04L 27/2602 |
| 2016/0330633 A1* | 11/2016 | You | ........................ | H04L 5/001 |
| 2016/0338013 A1* | 11/2016 | Yu | ......................... | H04L 1/0075 |
| 2017/0126367 A1* | 5/2017 | Gao | ........................ | H04L 1/189 |
| 2017/0338877 A1* | 11/2017 | Yum | ..................... | H04B 17/318 |
| 2017/0359836 A1* | 12/2017 | Kato | ..................... | H04W 74/08 |
| 2018/0070403 A1* | 3/2018 | Uemura | ................ | H04W 76/27 |
| 2018/0084578 A1* | 3/2018 | Kato | ................... | H04W 74/006 |
| 2018/0270634 A1* | 9/2018 | Kim | ........................ | H04L 27/26 |
| 2018/0337752 A1* | 11/2018 | Choi | ..................... | H04L 1/1896 |
| 2019/0174283 A1* | 6/2019 | Awad | .................... | H04L 1/1819 |
| 2020/0008225 A1* | 1/2020 | Lee | ......................... | H04L 1/189 |

FOREIGN PATENT DOCUMENTS

| | | |
|---|---|---|
| CN | 103209061 A | 7/2013 |
| CN | 103580827 A | 2/2014 |
| CN | 104160767 A | 11/2014 |
| EP | 2294744 A1 | 3/2011 |
| EP | 3497842 A1 | 6/2019 |
| WO | WO-2009134179 A1 | 11/2009 |
| WO | WO-2018030379 A1 | 2/2018 |

OTHER PUBLICATIONS

International Preliminary Report on Patentability for PCT/CN2017/096717, ISA/CN, Haidian District, Beijing, dated Feb. 19, 2019, with English translation attached.
Extended European Search Report from counterpart EP17838746.0, dated Mar. 4, 2020.

* cited by examiner

METHOD FOR TRANSMITTING HYBRID AUTOMATIC REPEAT REQUEST FEEDBACK INFORMATION, AND USER EQUIPMENT

CROSS REFERENCE TO RELATED APPLICATIONS

This application is a 371 U.S. National Stage of International Application No. PCT/CN2017/096717, filed on Aug. 10, 2017, which claims priority to Chinese Application No. 201610659378.1, filed on Aug. 11, 2016. The entire disclosures of the above applications are incorporated herein by reference.

TECHNICAL FIELD

This present disclosure relates to Hybrid Automatic Repeat Request (HARQ) and, in particular, to a method for transmitting HARQ feedback information and a user equipment.

BACKGROUND

In the Third Generation Partnership Project (3GPP) standard Rel. 13, one-to-one HARQ feedback is applied to a Half-Duplex (HD) Machine-To-machine Communication (MTC) system. That is, with respect to data received in each downlink subframe, such as a Physical Downlink Data Channel (PDSCH), HARQ feedback information for the data, for example, positive acknowledgment information (ACK) indicating that the data has been successfully received or negative acknowledgment information (NACK) indicating that the data has not been successfully received, is transmitted by a User Equipment (UE) in a subframe at a predetermined time after the subframe. However, in the half-duplex system, a subframe to be used for transmitting uplink HARQ feedback information may be allocated for downlink transmission, thus resulting in a conflict between the transmission of uplink feedback information and the transmission of downlink data. HARQ bundling is proposed in Rel. 14 to solve this problem, in which HARQ feedback information for a plurality of received data is bundled together and transmitted to a base station by the UE. For example, the UE performs a logical addition operation on the plurality of received data and transmits the calculation result as feedback information to the base station.

In a Rel. 14 based HD TDD MTC system, a downlink subframe on which HARQ bundling should be performed and an uplink subframe used for transmitting feedback information in the case that HARQ bundling is applied are specified for each downlink-uplink configuration. However, how to perform HARQ bundling is not discussed in the Rel. 14 based HD TDD MTC system.

Therefore, a method for performing HARQ bundling in a Rel. 14 based HD TDD MTC system is needed.

SUMMARY OF THE INVENTION

According to one embodiment of the present disclosure, a method for transmitting Hybrid Automatic Repeat Request (HARQ) feedback information is provided, comprising: determining a reception window of data on which HARQ bundling is to be performed; detecting data in the reception window; and bundling and transmitting HARQ feedback information for the data detected in the reception window.

In the method described above, the step of determining the reception window of data on which HARQ bundling is to be performed may include: determining a length and a starting position of the reception window.

In the method described above, the step of determining the length of the reception window may include: receiving a high layer signaling including information indicating the length.

In the method described above, the length of the reception window may be a predefined value.

In the method described above, the step of determining the length of the reception window may include: determining the length of the reception window based on the number of repetitions of a physical downlink shared channel and the number of repetitions of a physical downlink control channel.

In the method described above, the step of determining the starting position of the reception window may include: determining the starting position of the reception window based on the number of a frame, the number of a subframe included in the frame, and the length of the reception window.

In the method described above, the step of determining the starting position of the reception window may include: determining a subframe carrying a physical downlink shared channel among respective subframes included in a frame as the starting position of the reception window, the physical downlink shared channel having a Downlink Allocation Indicator (DAI) with a predetermined value.

In the method described above, the step of bundling and transmitting the HARQ feedback information for the data detected in the reception window may include: bundling and transmitting the HARQ feedback information for the data detected in the reception window at a predetermined time after the reception window ending.

In the method described above, the step of bundling and transmitting the HARQ feedback information may be performed in an uplink control channel or an uplink shared channel.

According to another embodiment of the present disclosure, a user equipment is provided, comprising: a determining unit configured to determine a reception window of data on which HARQ bundling is to be performed; a detecting unit configured to detect data in the reception window; a HARQ feedback unit configured to bundle and transmit HARQ feedback information for the data detected in the reception window.

In the user equipment described above, the determining unit may be configured to determine the reception window by determining a length and a starting position of the reception window.

In the user equipment described above, the determining unit may be configured to receive a high layer signaling including information indicating the length.

In the user equipment described above, the length of the reception window may be a predefined value.

In the user equipment described above, the determining unit may be configured to determine the length of the reception window based on the number of repetitions of a physical downlink shared channel and the number of repetitions of a physical downlink control channel.

In the user equipment described above, the determining unit may be configured to determine the starting position of the reception window based on the number of a frame, the number of a subframe included in the frame, and the length of the reception window.

In the user equipment described above, the determining unit may be configured to determine a subframe carrying a physical downlink shared channel among respective subframes included in a frame as the starting position of the reception window, the physical downlink shared channel having a Downlink Allocation Indicator (DAI) with a predetermined value.

In the user equipment described above, the HARQ feedback unit may be configured to bundle and transmit the HARQ feedback information for the data detected in the reception window at a predetermined time after the reception window ending.

In the user equipment described above, the HARQ feedback unit may be configured to bundle and transmit the HARQ feedback information in an uplink control channel or an uplink shared channel.

According to another embodiment of the present disclosure, a method for receiving Hybrid Automatic Repeat Request (HARQ) feedback information is provided, comprising: determining a reception window of data on which HARQ bundling is performed by a user equipment; and receiving HARQ feedback information for the data detected by the user equipment in the reception window which is bundled and transmitted by the user equipment.

In the method described above, the step of determining the reception window of data on which HARQ bundling is performed by a user equipment may include: determining a length and a starting position of the reception window.

In the method described above, the step of determining the length of the reception window may include: setting the length by a base station directly.

In the method described above, the length of the reception window may be a predefined value.

In the method described above, the step of determining the length of the reception window may include: determining the length of the reception window based on the number of repetitions of a physical downlink shared channel and the number of repetitions of a physical downlink control channel.

In the method described above, the step of determining the starting position of the reception window may include: determining the starting position of the reception window based on the number of a frame, the number of a subframe included in the frame, and the length of the reception window.

In the method described above, the step of determining the starting position of the reception window may include: determining a subframe carrying a physical downlink shared channel among respective subframes included in a frame as the starting position of the reception window, the physical downlink shared channel having a Downlink Allocation Indicator (DAI) with a predetermined value.

In the method described above, the step of receiving HARQ feedback information for the data detected by the user equipment in the reception window which is bundled and transmitted by the user equipment may include: receiving HARQ feedback information for the data detected by the user equipment in the reception window which is bundled and transmitted by the user equipment at a predetermined time after the reception window ending.

In the method described above, the step of receiving the HARQ feedback information for the data detected by the user equipment in the reception window which is bundled and transmitted by the user equipment may include: receiving the HARQ feedback information in an uplink control channel or an uplink shared channel.

According to another embodiment of the present disclosure, a base station is provided, comprising: a determining unit configured to determine a reception window of data on which HARQ bundling is performed by a user equipment; and a receiving unit configured to receive HARQ feedback information for the data detected by the user equipment in the reception window which is bundled and transmitted by the user equipment.

In the base station described above, the determining unit may be configured to determine the reception window of data on which HARQ bundling is performed by a user equipment through determining a length and a starting position of the reception window.

In the base station described above, the determining unit may be configured to determine the length through setting the length of the reception window directly.

In the base station described above, the length of the reception window may be a predefined value.

In the base station described above, the determining unit may be configured to determine the length of the reception window based on the number of repetitions of a physical downlink shared channel and the number of repetitions of a physical downlink control channel.

In the base station described above, the determining unit may be configured to determine the starting position of the reception window based on the number of a frame, the number of a subframe included in the frame, and the length of the reception window.

In the base station described above, the determining unit may be configured to determine a subframe carrying a physical downlink shared channel among respective subframes included in a frame as the starting position of the reception window, the physical downlink shared channel having a Downlink Allocation Indicator (DAI) with a predetermined value.

In the base station described above, the determining unit may be configured to receive the HARQ feedback information for the data detected by the user equipment in the reception window which is bundled and transmitted by the user equipment at a predetermined time after the reception window ending.

In the base station described above, the receiving unit may be configured to receive the HARQ feedback information in an uplink control channel or an uplink shared channel.

BRIEF DESCRIPTION OF THE DRAWINGS

The above and other objectives, features and advantages of the present disclosure will become more apparent from the more detailed description of the embodiments of the present disclosure in conjunction with the accompanying drawings. The drawings are included to provide a further understanding of the embodiments of the present disclosure, constitute a part of this specification, and help to explain the present disclosure together with the embodiments of the present disclosure, but are not intended to be a limitation to the present disclosure. In the drawings, same reference signs usually indicate same components or steps.

DESCRIPTION OF THE EMBODIMENTS

In order to make the objectives, technical solutions and advantages of the present disclosure more apparent, exemplary embodiments according to the present disclosure will be described in detail below with reference to the drawings. Apparently, the described embodiments are only a part but not all of embodiments of the present disclosure. It should be understood that the present disclosure is not limited by the example embodiments described herein. All other embodiments obtained by a person skilled in the art based on the embodiments of the present disclosure described herein without creative effort are intended to fall into the protection scope of the present disclosure.

Figure 1:
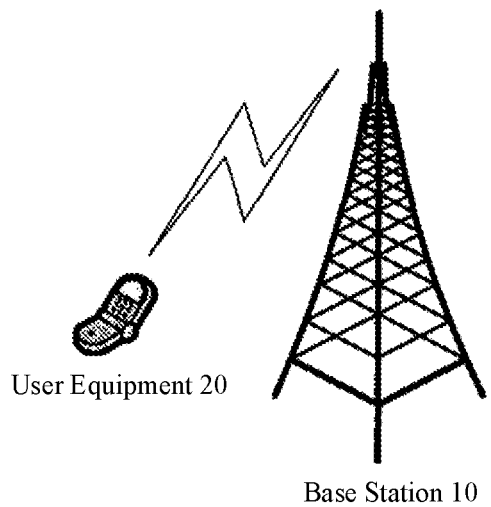
FIG. 1 is a schematic diagram in which a Half-Duplex (HD) Frequency Division Multiplexing (FDD) Machine-To-machine Communication (MTC) system according to embodiments of the present disclosure may be applied.

FIG. 1 is a schematic diagram in which a Half-Duplex (HD) Frequency Division Multiplexing (FDD) Machine-To-machine Communication (MTC) system according to embodiments of the present disclosure may be applied. As shown in FIG. 1, the system includes a base station (eNB) 10 and a User Equipment (UE) 20. In the system, the base station transmits control signal and data to the user equipment, and the user equipment receives and detects the control signal and the data and transmits feedback information for the data (HARQ feedback information) to the base station. The feedback information may be positive acknowledgment information (ACK) indicating that the data has been successfully received or negative acknowledgment information (NACK) indicating that the data has not been successfully received. The control signal may be, for example, a Physical Downlink Control Channel (PDCCH) or other control signals, and the data may be, for example, a Physical Downlink Shared Channel (PDSCH) or other data. In the following, explanation will be made sometimes by taking PDCCHs and PDSCHs as examples of control signal and data respectively. For example, the base station may transmit a PDCCH in a first subframe, in order to notify the user equipment of the subframe scheduled for transmission of the PDCCH and other control signals, and then may transmit a PDSCH in the scheduled subframe. One or more blank subframes may exist between the subframe in which the PDCCH is transmitted and the subframe in which the PDSCH is transmitted.

HARQ bundling is applied in an embodiment of the present disclosure. That is, when transmitting feedback information for the received data, rather than transmitting feedback information once for each of the received data, feedback information for a plurality of data received in a HARQ bundling window are bundled and transmitted. In particular, a logical operation may be performed on the feedback information for the plurality of data received in the HARQ bundling window, and the calculation result is transmitted as feedback information to the base station. For example, assuming that ACK is represented by 1, NACK is represented by 0, and feedback information for the four received data is 1, 1, 0, 1 in turn, a logical AND operation may be performed on the feedback information for the four received data, accordingly the calculation result 0 is obtained and then transmitted as feedback information to the base station. Thereby, the feedback information for the four data is bundled together and transmitted to the base station.

A method for transmitting and receiving HARQ feedback information, a User Equipment (UE) using the method and a corresponding base station (eNB) according to embodiments of the present disclosure will be described below with reference to the drawings.

First, a method for transmitting HARQ feedback information according to embodiments of the present disclosure will be described with reference to FIG. 2. This method may be performed by the UE.

Figure 2:
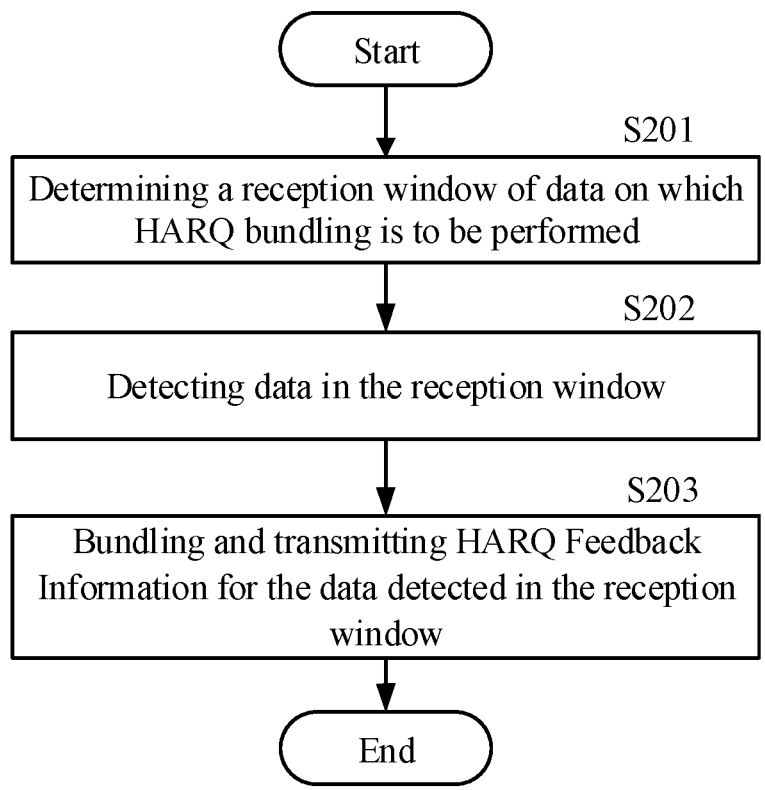
FIG. 2 is a flow chart showing a method for transmitting HARQ feedback information according to embodiments of the present disclosure.

As shown in FIG. 2, at step S201, a reception window of data on which HARQ bundling is to be performed, i.e., the HARQ bundling window described above, is determined.

In particular, the reception window may be determined by determining a length and a starting position of the reception window. The length of the reception window may be represented by the number of subframes included in the reception window. Furthermore, the position of the reception window may be represented by the position of the first subframe included in the reception window.

A variety of manners may be adopted to determine the length of the reception window. In one implementation, a length of a HARQ bundling window may be determined by receiving a high layer signaling including information indicating the length. The high layer signaling may be, for example, a System Information Block (SIB). For example, the base station may broadcast the SIB in a cell so as to notify the UE of the length. In this case, the length of the reception window is dedicated to the cell.

In another implementation, the length of the reception window may be a predefined value. For example, the length of the reception window may be configured in the base station and the UE as a predefined value, such that the base station and the UE may determine the length of the reception window by reading the predefined value.

Figure 3A:
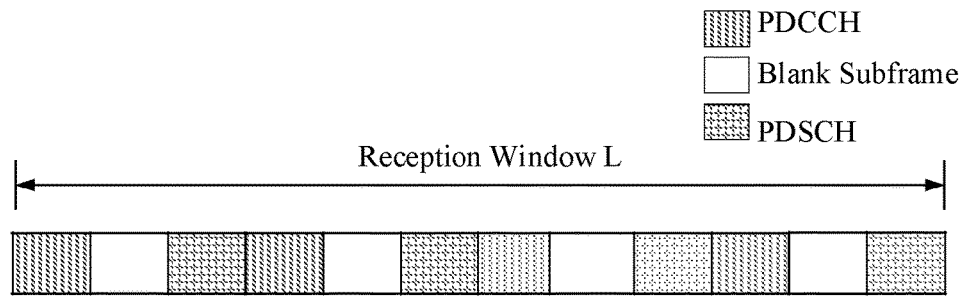
FIG. 3A shows a first example of determining a length of a reception window (a HARQ bundling window).
Figure 3B:
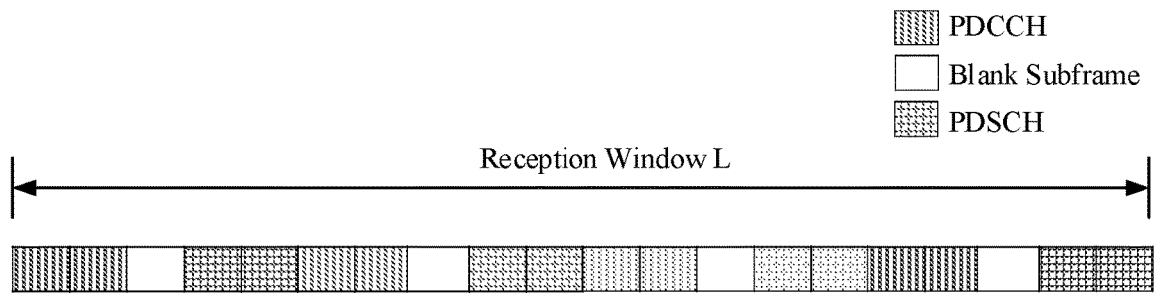
FIG. 3B shows a second example of determining a length of a reception window (a HARQ bundling window).

In another implementation, the length of the reception window may be determined implicitly. For example, the length of the reception window may be determined based on the number of repetitions of data (e.g., PDSCHs) and the number of repetitions of control information (e.g., PDCCHs) transmitted by the base station. In particular, a PDCHH and/or a PDSCH may be repeatedly transmitted multiple times by the base station to ensure that the UE can receive the PDCCH and the PDSCH, in case of poor channel quality between the UE and the base station. In this case, the determined length is dedicated to the UE. In the implementation, one or more blank subframes may exist between the transmitted PDCCH and PDSCH, such that each PDCCH, the PDSCH transmitted after the PDCCH and the one or more blank subframes existing between the PDCCH and the PDSCH form one group. The reception window may contain one or more such groups, thus the length L of the reception window may be determined by the following equation (1):

$$L = M^*(R_{PDCCH} + R_{PDSCH} + n) \qquad (1)$$

where $R_{PDCCH}$ is the number of repetitions of the PDCCH, $R_{PDSCH}$ is the number of repetitions of the PDSCH, n is the number of the blank subframes between the PDCCH and the PDSCH, and $R_{PDCCH} \geq 1$, $R_{PDSCH} \geq 1$, $n \geq 1$. Furthermore, $M \geq 1$ and may be, e.g., 4. $R_{PDCCH}$ and $R_{PDSCH}$ may be configured and notified to the UE by the base station. In this case, the configured $R_{PDCCH}$ and $R_{PDSCH}$ may be notified to the UE by the base station through a high layer signaling, such as radio resource control (RRC) signaling. M and n may also be configured by the base station and signaled to the UE, for example by signaling such as RRC signaling, or may be a predefined value and pre-configured in the base station and the UE. FIG. 3A shows a first example of determining the length of the reception window in the implementation, in which M is 4, n is 1 and both $R_{PDCCH}$ and $R_{PDSCH}$ are 1. In this example, it can be determined that L is 12, i.e., the length of the reception window is 12 subframes. FIG. 3B shows a second example of determining the length of the reception window in the implementation, in which M is 4, n is 1 and both $R_{PDCCH}$ and $R_{PDSCH}$ are 2. In this example, it can be determined that L is 20, i.e., the length of the reception window is 20 subframes.

Figure 4:
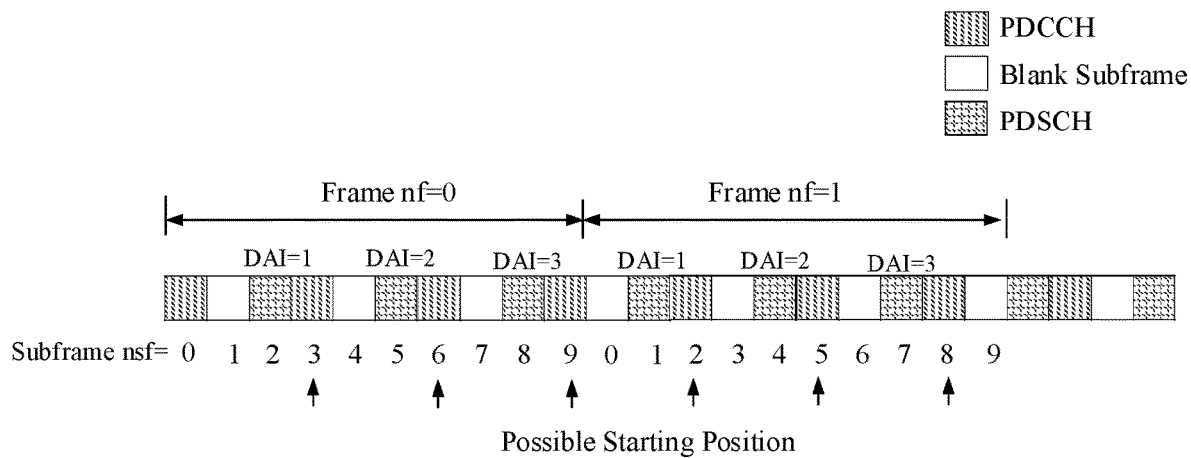
FIG. 4 shows an example of determining a starting position of a reception window (a HARQ bundling window).

Furthermore, a variety of manners may be adopted to determine the starting position of the reception window. In one implementation, the starting position of the reception window may be determined based on the number of a frame, the number of a subframe included in the frame and the length of the reception window. For example, by representing the number of the frame (frame number) as of and the number of the subframe include in the frame (subframe number) as nsf, a subframe in the frame satisfying the following equation (2) may be determined as the starting position of the reception window:

$$(nsf+10*nf) \bmod(L) = \text{offset} \qquad (2)$$

where L is the length of the reception window, "offset" is an offset set as needed, such as 0, 1 or other values, and may be pre-configured in the UE and the base station, or configured by the base station and signaled to the UE, so that the UE can learn the offset by receiving the signaling. For example, the offset may be set to 0, in which case, a subframe in the frame satisfying (nsf+10*nf) mod (L)=0 may be determined as the starting position of the reception window. FIG. 4 shows a first example of determining the starting position of the reception window. In the FIG. 4, assuming L=3, then subframes of nsf=3, 6, or 9 may be determined as the starting position of the reception window when nf=0, and subframes of nsf=2, 5, or 8 may be determined as the starting position of the reception window when nf=1.

In another implementation, a subframe carrying a PDSCH among respective subframes included in a frame may be determined as the starting position of the reception window, where the physical downlink shared channel has a Downlink Allocation Indicator (DAI) with a predetermined value. As known in the art, the DAI of the PDSCH indicates the subframe where the PDSCH located is which downlink subframe in the frame including the subframe. The predetermined value may be set flexibly as actual needs, such as 1, 2 etc., and pre-configured in the UE and the base station, or may be configured and notified to the UE by the base station. In the example shown in FIG. 4, assuming the predetermined value is 1, i.e., a subframe carrying a PDSCH of DAI=1 in the frame is determined as the starting position of the reception window, in which case, the subframe 2 in each frame may be determined as the starting position of the reception window.

Return to FIG. 2, at step S202, data is detected in the reception window. In particular, the reception window may be located after the starting position and the length of the reception window are determined, and the PDSCH transmitted by the base station is detected in the reception window, i.e., the subframe carrying the PDSCH among the subframes of the reception window is detected. A subframe carrying a PDSCH may be detected using methods well known in the art, which will not be described herein.

Next, at step S203, HARQ feedback information for the data detected in the reception window (PDSCHs) will be bundled and transmitted.

In particular, each of the received PDSCHs may be decoded, and feedback information for the PDSCH, i.e., HARQ feedback information, is generated according to the decoding result. For example, ACK may be generated when the decoding for the PDSCH succeeds, and NACK may be generated when the decoding for the PDSCH fails. Then, a logical operation may be performed on the feedback information for a plurality of data detected in the reception window in the manner described above, and the calculation result is transmitted to the base station as feedback information, thereby the feedback information for the plurality of data detected in the reception window may be bundled together and transmitted to the base station. In one implementation, HARQ feedback information for data detected in the reception window may be bundled and transmitted at a predetermined time after the reception window ending. The predetermined time may be set flexibly as actual needs and pre-configured in the UE and the base station, or may be configured and notified to the UE by the base station. For example, the predetermined time me be set as 4 ms after the reception window ending, such that the feedback information is transmitted 4 ms (the fourth subframe) after the reception window ending.

Figure 5:
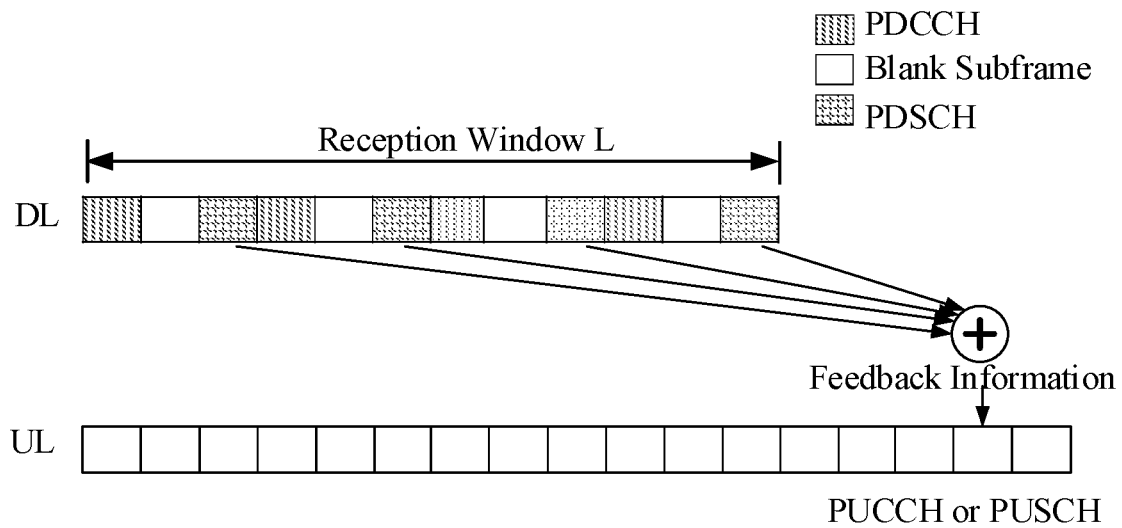
FIG. 5 schematically shows a manner for bundling and transmitting HARQ feedback information.

HARQ feedback information may be bundled and transmitted in an Uplink Control Channel (PUCCH) or an Uplink Shared Channel (PUSCH), when the HARQ feedback information for the data detected in the reception window is bundled and transmitted, as shown in FIG. 5. In particular, a subframe at a predetermined time after the reception window ending may be scheduled for transmission of a PUSCH or a PUCCH. In the case that the subframe is scheduled for transmission of a PUSCH, the PUSCH may be adopted to carry the HARQ feedback information. On the other hand, in the case that the subframe is scheduled for transmission of a PUCCH, the PUCCH may be adopted to carry the HARQ feedback information.

The method for receiving HARQ feedback information according to embodiments of the present disclosure will be described below, with reference to FIG. 6. The method may be performed by the base station.

Figure 6:
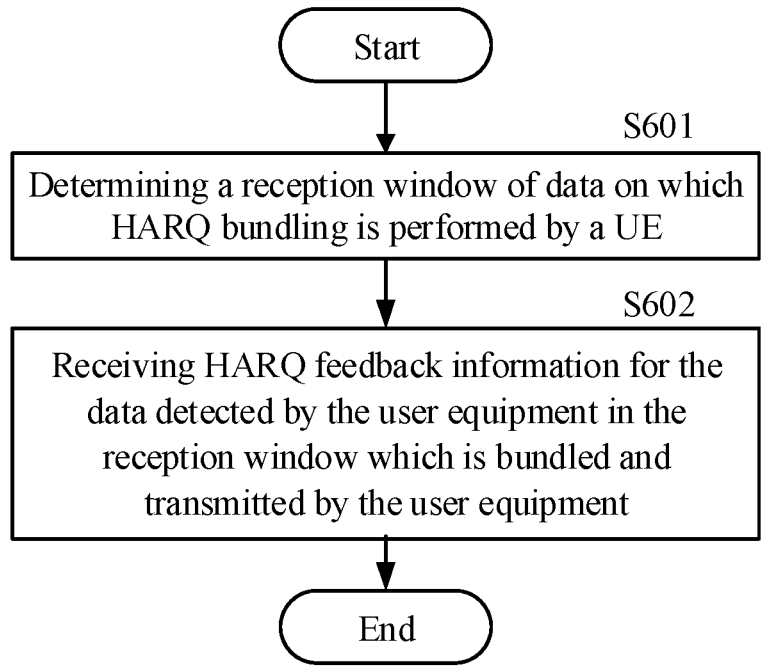
FIG. 6 is a flow chart showing a method for receiving HARQ feedback information according to embodiments of the present disclosure.

As shown in FIG. 6, at step S601 a reception window of data on which HARQ bundling is performed by the UE is determined.

In particular, the reception window may be determined by determining a length and a starting position of the reception window. The length of the reception window may be represented by the number of subframes included in the reception window herein. Furthermore, the position of the reception window may be represented by the position of the first subframe included in the reception window.

A variety of manners may be adopted to determine the length of the reception window.

In one implementation, the length of the reception window (the HARQ bundling window) may be set directly by the base station. The base station may transmits information indicating the set length to the UE by signaling.

In another implementation, the length of the reception window may be a predefined value as described above, so that the base station may determine the length of the reception window by reading the predefined value.

In another implementation, the length of the reception window may be determined implicitly. For example, the length of the reception window may be determined based on the number of repetitions of data (e.g., PDSCHs) and the number of repetitions of control information (e.g., PDCCHs) transmitted to the UE. For example, the base station may determine the length of the reception window according to the manner described above with respect to equation (1).

In another implementation, the length of the reception window may be determined by receiving information indicating the length from UE.

Furthermore, a variety of manners may be adopted to determine the starting position of the reception window.

In one implementation, the starting position of the reception window may be determined based on the number of a frame, the number of a subframe included in the frame and the length of the reception window. For example, the starting position of the reception window may be determined in the manners described above, which will not be repeated here.

In another implementation, a subframe carrying a PDSCH among respective subframes included in a frame may be determined as the starting position of the reception window, where the physical downlink shared channel has a Downlink Allocation Indicator (DAI) with a predetermined value. The predetermined value, such as 1, 2 etc., may be set flexibly as actual needs and pre-configured in the UE and the base station, or may be configured and notified to the UE by the base station.

Next, at step S602, HARQ feedback information for the data detected by the UE in the reception window which is bundled and transmitted by the UE is received.

In one implementation, HARQ feedback information the reception window ending for the data detected by the UE in the reception window which is bundled and transmitted by the UE at a predetermined time after the reception window ending may be received. The predetermined time may be set flexibly as actual needs and pre-configured in the UE and the base station, or may be configured and notified to the UE by the base station. For example, the predetermined time may be set as 4 ms after the reception window ending.

Furthermore, as discussed above, the HARQ feedback information may be transmitted in a PUCCH or a PUSCH, when the UE bundles and transmits the HARQ feedback information for the data detected in the reception window. Accordingly, on the base station side, the HARQ feedback information may be received in a PUCCH or a PUSCH.

After receiving the feedback information, the base station may decode it to confirm whether transmission of the PDSCH is successful. For example, when a logical AND operation is performed on feedback information for a plurality of PDSCHs so as to bundle and transmit the feedback information, if the bundled and transmitted feedback information received by the base station is 0, it indicates that at least one of the plurality of PDSCHs is not successfully received, thereby the plurality of PDSCHs can be requested to be retransmitted.

The UE according to embodiments of the present disclosure will be described below with reference to FIG. 7. Contents same as the method described above with reference to FIG. 2 will not be repeated here for the sake of simplicity.

Figure 7:
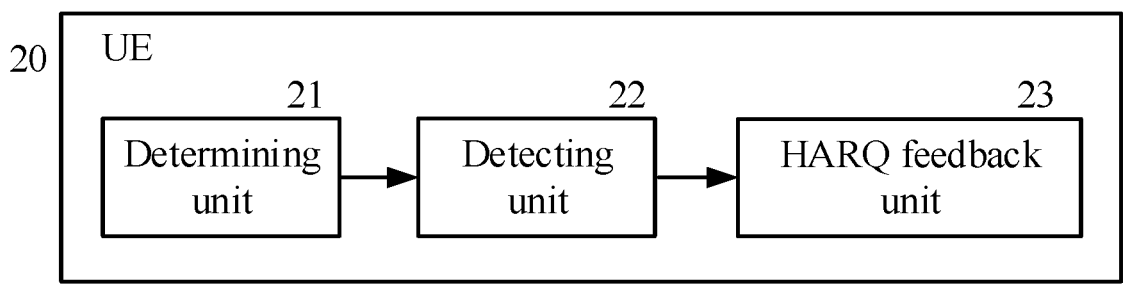
FIG. 7 is a block diagram showing a user equipment according to embodiments of the present disclosure.

As shown in FIG. 7, the UE 20 according to embodiments of the present disclosure includes a determining unit 21, a detecting unit 22 and a HARQ feedback unit 23. It should be appreciated that only the units in the UE that are closely related to embodiments of the present disclosure are illustrated, while other units of the UE are omitted for the sake of simplicity, which is not restrictive. The UE may include other units as needs, such as various data processing units.

The determining unit 21 determines a reception window of data on which HARQ bundling is to be performed, i.e., the HARQ bundling window described above. In particular, the determining unit may determine the reception window by determining a length and a starting position of the reception window.

The determining unit 21 may determine the length of the reception window using a variety of manners. In one implementation, the determining unit 21 may determine the length of the HARQ bundling window by receiving a high layer signaling including information indicating the length (e.g., via a receiving unit (not illustrated)). The high layer signaling may be, for example, a System Information Block (SIB). In another implementation, the length of the reception window may be a predefined value and, for example, pre-configured in the base station and the UE. In this case, the determining unit 21 may determine the length of the reception window by reading the predefined value. In another implementation, the determining unit 21 may determine the length of the reception window implicitly. For example, the determining unit 21 may determine the length of the reception window based on the number of repetitions of data (e.g., PDSCHs) and the number of repetitions of control information (e.g., PDCCHs) transmitted by the base station. For example, the determining unit 21 may determine the length of the reception window based on the number of repetitions of PDSCH and the PDCCH through the above equation (1) in the manner described above.

Furthermore, the determining unit 21 may determine the starting position of the reception window using a variety of manners. In one implementation, the determining unit 21 may determine the starting position of the reception window based on the number of a frame, the number of a subframe included in the frame and the length of the reception window. For example, the determining unit 21 may determine the starting position of the reception window using the above equation (2) in the manner described above. In another implementation, the determining unit 21 may determine a subframe carrying a PDSCH among respective subframes included in a frame as the starting position of the reception window, where the physical downlink shared channel has a Downlink Allocation Indicator (DAI) with a predetermined value.

The detecting unit 22 may detect data in the reception window determined by the determining unit 21. In particular, the detecting unit 22 may locate the reception window, after the starting position and the length of the reception window are determined by the determining unit 21, and may detect the PDSCH transmitted by the base station in the reception window. The detecting unit 22 may detect a subframe carrying a PDSCH using methods well known in the art, which will not be described herein.

The HARQ feedback unit 23 may bundle and transmit HARQ feedback information for data (PDSCHs) detected in the reception window. In particular, the HARQ feedback unit 23 may decode each of the received PDSCHs, and generate feedback information, i.e., HARQ feedback information, for the PDSCH according to the decoding result. The HARQ feedback unit 23 may then perform a logical operation on feedback information for a plurality of data detected in the reception window in the manner described above, and transmit the calculation result as the feedback information to the base station, thereby the HARQ feedback unit 23 may bundle together the feedback information for the plurality of data detected in the reception window and transmit it to the base station. In one implementation, the HARQ feedback unit 23 may bundle and transmit HARQ feedback information for data detected in the reception window at a predetermined time after the reception window ending. The predetermined time may be set flexibly as actual needs and pre-configured in the UE and the base station, or may be configured and notified to the UE by the base station. For example, the predetermined time may be set as 4 ms after the reception window ending, such that the feedback information is transmitted 4 ms (the fourth subframe) after the reception window ending.

The HARQ feedback unit 23 may bundle and transmit the HARQ feedback information in an Uplink Control Channel (PUCCH) or an Uplink Shared Channel (PUSCH) when the HARQ feedback information for the data detected in the reception window is bundled and transmitted. In particular, a subframe at a predetermined time after the reception window ending may be scheduled for transmission of a PUSCH or a PUCCH. In the case that the subframe is scheduled for transmission of a PUSCH, the PUSCH may be used by the HARQ feedback unit 23 to carry the HARQ feedback information. On the other hand, in the case that the subframe is scheduled for transmission of a PUCCH, the PUCCH may be used by the HARQ feedback unit 23 to carry the HARQ feedback information.

The base station according to embodiments of the present disclosure will described below with reference to FIG. 8.

Figure 8:
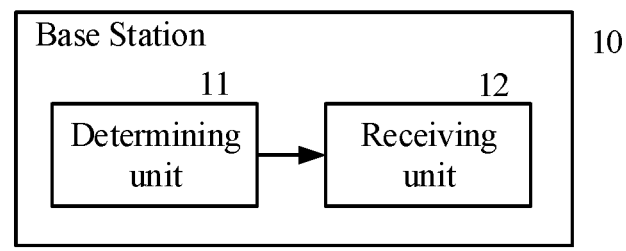
FIG. 8 is a block diagram showing a base station according to embodiments of the present disclosure.

As shown in FIG. 8, the base station 10 according to embodiments of the present disclosure includes a determining unit 11 and a receiving unit 12. It should be appreciated that only the units in the base station that are closely related to embodiments of the present disclosure are illustrated, while other units of the base station are omitted for the sake of simplicity, which is not restrictive. The base station may include other units as needs, such as various data processing units. For the reason that many details of the functions of the determining unit 11 and the receiving unit 12 are substantially the same as the method described with reference to FIG. 6, the description of the same contents is omitted here.

The determining unit 11 may determine a reception window of data on which HARQ bundling is performed by the UE.

In particular, the determining unit 11 may determine the reception window by determining a length and a starting position of the reception window. The determining unit 11 may determine the length of the reception window using a variety of manners.

In one implementation, the determining unit 11 may set the length of the reception window (the HARQ bundling window) directly. The base station may transmit information indicating the set length to the UE by signaling through, e.g., a transmitting unit (not illustrated).

In another implementation, the length of the reception window may be a predefined value as described above, such that the determining unit 11 may determine the length of the reception window by reading the predefined value.

In another implementation, the determining unit 11 may determine the length of the reception window implicitly. For example, the determining unit 11 may determine the length of the reception window based on the number of repetitions of data (e.g., PDSCHs) and the number of repetitions of control information (e.g., PDCCHs) transmitted to the UE.

In another implementation, the determining unit 11 may determine the length of the reception window by receiving information indicating the length from the UE.

Furthermore, the determining unit 11 may determine the starting position of the reception window using a variety of manners.

In one implementation, the determining unit 11 may determine the starting position of the reception window based on the number of a frame, the number of a subframe included in the frame and the length of the reception window. For example, the starting position of the reception window may be determined in manners described above, which will not be repeated here.

In another implementation, the determining unit 11 may determine a subframe carrying a PDSCH among respective subframes included in a frame as the starting position of the reception window, where the physical downlink shared channel has a Downlink Allocation Indicator (DAI) with a predetermined value. The predetermined value may be set flexibly as actual needs and pre-configured in the UE and the base station, or may be configured and notified to the UE by the base station.

The receiving unit 12 may receive HARQ feedback information for data detected by the UE in the reception window which is bundled and transmitted by the UE.

In one implementation, the receiving unit 12 may receive HARQ feedback information for data detected by the UE in the reception window, which is bundled and transmitted by the UE at a predetermined time after the reception window ending. The predetermined time may be set flexibly as actual needs and pre-configured in the UE and the base station, or may be configured and notified to the UE by the base station.

Furthermore, as discussed above, when the UE bundles and transmits the HARQ feedback information for the data detected in the reception window, the HARQ feedback information may be bundled and transmitted in a PUCCH or a PUSCH. Accordingly, on the base station side, the receiving unit 12 may receive the HARQ feedback information in a PUCCH or a PUSCH.

After receiving the feedback information, the base station may decode the feedback information e.g. by a decoding unit (not illustrated), to confirm whether transmission of the PDSCH is successful. For example, when a logical AND operation is performed on feedback information for a plurality of PDSCHs so as to bundle and transmit the feedback information, if the bundled and transmitted feedback information which is received by the base station is 0, it indicates that at least one of the plurality of PDSCHs is not successfully received, thereby the plurality of PDSCHs can be requested to be retransmitted.

By using the method for transmitting HARQ feedback information, the UE and the base station according to embodiments of the present disclosure, in a HDD FDD MTC system, data on which HARQ bundling is to be performed can be conveniently determined and feedback information for these data can be bundled and transmitted.

It should be noted that the terms "include", "comprise" or any other variations thereof in the specification are intended to encompass a non-exclusive inclusion, such that a process, method, article or device comprising a series of elements includes not only those elements, but also other elements that are not explicitly listed, or elements inherent to such a process, method, article or device. In the absence of further restrictions, an element defined by the phrase "comprising a . . . " does not exclude the presence of additional equivalent elements in the process, method, article or device comprising the said element.

Finally, it should be further noted that the series of processes described above include not only processes executed in time sequence in the order described herein, but also processes executed in parallel or separately rather than in time sequence.

Through the description of the above embodiments, those skilled in the art can clearly understand that the present disclosure may be implemented by means of software plus a necessary hardware platform, and certainly may also be implemented completely by hardware. Based on such understanding, all or part of technical solutions of the present disclosure contributing to the background art may be embodied in the form of a software product that may be stored in a storage medium, such as a ROM/RAM, a magnetic disk, an optical disk or the like, including several instructions to enable a computer device (such as, a personal computer, a server, or a network device, etc.) to execute the methods described in various embodiments or portions of the embodiments of the present disclosure.

The present disclosure has been described in detail above. Specific examples are applied herein to explain the principles and embodiments of the present disclosure, and the explanation of the above embodiments is intended to help understand the method and its core ideas of the present disclosure; in the meantime, changes shall be made in the specific implementations and application scope for those skilled in the art with benefit of the present disclosure. In conclusion, the contents of this specification should not be constructed as limitation of the present disclosure.

What is claimed is:

1. A method for transmitting hybrid automatic repeat request feedback information, comprising:
    determining a reception window of data on which hybrid automatic repeat request bundling is to be performed;
    detecting data in the reception window; and
    bundling and transmitting hybrid automatic repeat request feedback information for the data detected in the reception window, wherein the data detected in the reception window comprises a plurality of physical downlink shared channels,
    the method further comprising:
        determining a length and a starting position of the reception window, wherein the length of the reception window is determined based on a number of repetitions of each physical downlink shared channel and each physical downlink control channel associated with each physical downlink shared channel.

2. A user equipment, comprising:
    a processor;
    a storage medium having computer program instructions stored thereon, wherein the computer program instructions, when executed by the processor, perform processing of:
    determining a reception window of data on which hybrid automatic repeat request bundling is to be performed;
    detecting data in the reception window; and
    bundling and transmitting hybrid automatic repeat request feedback information for the data detected in the reception window, wherein the data detected in the reception window comprises a plurality of physical downlink shared channels,
    determining the reception window by determining a length and a starting position of the reception window, wherein the length of the reception window is determined based on a number of repetitions of a physical downlink shared channel and a number of repetitions of a physical downlink control channel.

3. The user equipment according to claim 2, wherein the processor is configured to determine the starting position of the reception window based on a frame number of a frame, a subframe number of a subframe included in the frame, and the length of the reception window.

4. The user equipment according to claim 2, wherein the processor is configured to determine a subframe carrying a physical downlink shared channel among respective subframes included in a frame as the starting position of the reception window, the physical downlink shared channel having a downlink allocation indicator with a predetermined value.

5. The user equipment according to claim 2, wherein the processor is configured to bundle and transmit the hybrid automatic repeat request feedback information for the data detected in the reception window at a predetermined time after the reception window ending.

6. The user equipment according to claim 2, wherein the processor bundles and transmits the hybrid automatic repeat request feedback information in an uplink control channel or an uplink shared channel.

7. A base station, comprising:
    a processor;
    a storage medium having computer program instructions stored thereon, wherein the computer program instructions, when executed by the processor, perform processing of:
    determining a reception window of data on which hybrid automatic repeat request bundling is performed by a user equipment; and
    receiving hybrid automatic repeat request feedback information for the data detected by the user equipment in the reception window which is bundled and transmitted by the user equipment, wherein the data detected in the reception window comprises a plurality of physical downlink shared channels,
    determining the reception window of data on which hybrid automatic repeat request bundling is performed by the user equipment by determining a length and a starting position of the reception window, wherein the length of the reception window is determined based on a number of repetitions of a physical downlink shared channel and a number of repetitions of a physical downlink control channel.

8. The base station according to claim 7, wherein the processor is configured to determine the starting position of the reception window based on a frame number of a frame, a subframe number of a subframe included in the frame, and the length of the reception window.

9. The base station according to claim 7, wherein the processor is configured to determine a subframe carrying a physical downlink shared channel among respective subframes included in a frame as the starting position of the reception window, the physical downlink shared channel having a downlink allocation indicator with a predetermined value.

10. The base station according to claim 7, wherein the processor is configured to receive hybrid automatic repeat request feedback information for the data detected by the user equipment in the reception window which is bundled and transmitted by the user equipment at a predetermined time after the reception window ending.

11. The base station according to claim 7, wherein the processor is configured to receive the hybrid automatic repeat request feedback information in an uplink control channel or an uplink shared channel.

* * * * *